US009918264B1

(12) United States Patent
Bitra et al.

(10) Patent No.: US 9,918,264 B1
(45) Date of Patent: Mar. 13, 2018

(54) REPORTING OF INFORMATION BEFORE A SCHEDULED TIME

(71) Applicant: QUALCOMM Incorporated, San Diego, CA (US)

(72) Inventors: Suresh Kumar Bitra, Mangalagiri (IN); Arun Kumar Sharma Tandra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/261,485

(22) Filed: Sep. 9, 2016

(51) Int. Cl.
| H04W 36/00 | (2009.01) |
| H04W 36/14 | (2009.01) |
| H04W 24/10 | (2009.01) |
| H04W 8/08 | (2009.01) |
| H04W 4/02 | (2018.01) |
| H04W 36/30 | (2009.01) |
| H04W 36/32 | (2009.01) |
| H04W 88/06 | (2009.01) |

(52) U.S. Cl.
CPC ............ *H04W 36/14* (2013.01); *H04W 4/02* (2013.01); *H04W 8/08* (2013.01); *H04W 24/10* (2013.01); *H04W 36/0016* (2013.01); *H04W 36/30* (2013.01); *H04W 36/32* (2013.01); *H04W 88/06* (2013.01)

(58) Field of Classification Search
None
See application file for complete search history.

(56) References Cited

U.S. PATENT DOCUMENTS

| 8,166,190 | B2* | 4/2012 | Stryzak | H04L 12/1859 |
| | | | | 370/386 |
| 9,374,749 | B2* | 6/2016 | Griot | H04W 36/06 |
| 9,603,003 | B2* | 3/2017 | Bellamkonda | H04W 8/12 |
| 2010/0309883 | A1* | 12/2010 | Nagasawa | H04W 36/30 |
| | | | | 370/331 |
| 2012/0083278 | A1 | 4/2012 | Kazmi et al. | |
| 2013/0237247 | A1* | 9/2013 | Lee | G01S 5/06 |
| | | | | 455/456.1 |
| 2013/0281113 | A1* | 10/2013 | Schlaupitz | H04W 52/0254 |
| | | | | 455/456.1 |
| 2014/0295825 | A1* | 10/2014 | Chuang | H04W 24/04 |
| | | | | 455/425 |

(Continued)

FOREIGN PATENT DOCUMENTS

WO 2012047070 A2 4/2012

OTHER PUBLICATIONS

"Secure User Plane Location Architecture; OMA-AD-SUPL-V2_0-20080430-D", OMA-AD-SUPL-V2_0-20080430-D, Open Mobile Alliance (OMA), 4330 La Jolla Village Dr., Suite 110, San Diego, CA, 92122; USA, No. 2.0, Apr. 30, 2008 (Apr. 30, 2008), pp. 1-55, XP064089494, Retrieved from the Internet: URL: ftp/Public_documents/LOC/2008/[retrieved on May 7, 2008].

(Continued)

*Primary Examiner* — Shantell L Heiber
(74) *Attorney, Agent, or Firm* — Hunter Clark PLLC

(57) ABSTRACT

A mobile device can send information to a server by first obtaining, by the mobile device, a scheduled time to send the information to the server. In response to determining, by the mobile device, that a trigger condition is met before the scheduled time, the mobile device sends at least a portion of the information from the mobile device to the server.

26 Claims, 7 Drawing Sheets

(56) References Cited

U.S. PATENT DOCUMENTS

| | | | | |
|---|---|---|---|---|
| 2014/0334293 | A1* | 11/2014 | Narasimha | H04W 28/08 370/229 |
| 2015/0038140 | A1* | 2/2015 | Kilpatrick, II | H04W 64/00 455/436 |
| 2015/0230057 | A1 | 8/2015 | Jiang et al. | |
| 2016/0234645 | A1* | 8/2016 | Belghoul | G01C 5/06 |
| 2016/0261737 | A1* | 9/2016 | Zhang | H04M 3/2236 |

OTHER PUBLICATIONS

International Search Report and Written Opinion—PCT/US2017/041847—ISA/EPO—dated Oct. 19, 2017.

Qualcomm Incorporated., et al., "Addition of an Early Position Fix in LPP," 3GPP Draft, 3GPP TSG-RAN WG2, Meeting #87bis, R2-144116, vol. RAN WG2, No. Shanghai, P.R. China, Oct. 6, 2014-Oct. 10, 2014, Oct. 5, 2014, 10 pages, XP050876395, Retrieved from the Internet: URL:http://www.3gpp.org/ftpjMeetings_3GPP_SYNC/RAN2/Docs/ [retrieved on Oct. 5, 2014].

Samsung., "Positioning Enhancement to Provide Early Location Information," 3GPP Draft, 3GPP TSG RAN WG2 #87bis, R2-144172, vol. RAN WG2, No. Shanghai, China, Oct. 6, 2014-Oct. 10, 2014, Oct. 5, 2014, 4 pages, XP050876438. Retrieved from the Internet: URL:http://www.3gpp.org/ftp/Meetings_3GPP_SYNC/RAN2/Docs/ [retrieved on Oct. 5, 2014].

\* cited by examiner

REPORTING OF INFORMATION BEFORE A SCHEDULED TIME

BACKGROUND

Mobile devices, such as cellular telephones, communicate wirelessly with a communications network via, for example, base stations that serve a geographic area referred to as a cell. Some mobile devices are equipped with global positioning systems (GPS) and terrestrial positioning systems (TPS) that allow the mobile device to make location related measurements that can be used to determine location information for the mobile device. A mobile device with GPS or TPS can transmit some or all of the location related measurements and/or location information to a location server connected to the communications network. The location server may, for example, be an enhanced serving mobile location center (E-SMLC) or a secure user plane location (SUPL) location platform (SLP). The location server can provide assistance data to a mobile device to aid in determining the location of the mobile device. The location related measurements and/or location information received from the mobile device can be used by the location server for a variety of purposes, such as determining the location of the mobile device and determining assistance data that may be sent to other mobile devices.

One example of the above-mentioned exchange of location information and assistance data in a long term evolution (LTE) network is the LTE positioning protocol (LPP), which is a standard protocol defined by the $3^{rd}$ Generation Partnership Project (3GPP). In LPP, a mobile device receives assistance data from the location server and a request for the mobile device to report location information back to the location server by a scheduled time. The mobile device makes measurements of Reference Signal Time Difference (RSTD), which is a measurement of the relative time difference between various base stations associated with nearby cells, and is the basis of an observed time difference of arrival (OTDOA) calculation. The mobile device then sends the results of the OTDOA calculation to the location server at the scheduled time.

SUMMARY

An example of a method of sending information from a mobile device to a server includes obtaining, by the mobile device, a scheduled time to send the information to the server; determining, by the mobile device, that a trigger condition is met before the scheduled time; and sending, by the mobile device, at least a portion of the information from the mobile device to the server, in response to determining that the trigger condition is met before the scheduled time.

Implementations of such a method may include one or more of the following features. Determining that the trigger condition is met may include determining that the mobile device is likely to lose a connection to a wireless network before the scheduled time. Determining that the mobile device is likely to lose a connection to a wireless network may include determining that the mobile device will, by the scheduled time, have insufficient battery power to maintain the connection to the wireless network. Determining that the mobile device is likely to lose the connection to a wireless network may include determining that a signal strength indicator is below a signal strength threshold and/or a signal quality indicator is below a signal quality threshold.

Implementations of such a method may also, or alternatively, include one or more of the following features. Determining that the mobile device is likely to lose the connection to a wireless network may include determining that a transceiver of the mobile device will stop communicating with a first wireless network to begin communicating with a second wireless network. The first wireless network may be a long term evolution (LTE) network and the second wireless network may be a non-LTE network. The information may include first information and second information, the first information being supported by the LTE network and not supported by the non-LTE network, and the second information being supported by the LTE network and the non-LTE network. Sending at least a portion of the information from the mobile device to the server before the scheduled time may include sending the first information to the LTE network before the scheduled time. The method may also include sending the second information to the non-LTE network after sending the first information.

Implementations of such a method may also, or alternatively, include one or more of the following features. The information may include location information regarding the location of the mobile device. The location information may include reference signal time difference (RSTD) measurement data. The scheduled time may be an early time or a final time associated with a long term evolution (LTE) positioning protocol (LPP). The trigger condition may include receiving a request for the information from the server. The method may further include periodically sending measurement reports to the server prior to determining that the trigger condition is met.

An example of a mobile device for sending information to a server includes a transceiver for wirelessly transmitting messages to and wirelessly receiving messages from the server via a wireless network; and a processor, communicatively coupled to the transceiver. The processor is configured to obtain a scheduled time to send the information to the server; determine that a trigger condition is met before the scheduled time; and send, to the server and via the transceiver, at least a portion of the information in response to determining that the trigger condition is met before the scheduled time.

Implementations of such a mobile device may include one or more of the following features. The processor may be configured to determine that the trigger condition is met by determining that the mobile device is likely to lose a connection to the wireless network before the scheduled time. The processor may be configured to determine that the mobile device is likely to lose a connection to the wireless network by determining that the mobile device will, by the scheduled time, have insufficient battery power to maintain the connection to the wireless network. The processor may be configured to determine that the mobile device is likely to lose a connection to the wireless network by determining that a signal strength indicator is below a signal strength threshold and/or a signal quality indicator is below a signal quality threshold.

Implementations of such a mobile device may also, or alternatively, include one or more of the following features. The processor may be configured to determine that the mobile device is likely to lose a connection to the wireless network by determining that the transceiver will stop communicating with a first wireless network to begin communicating with a second wireless network. The first wireless network may be a long term evolution (LTE) network and the second wireless network may be a non-LTE network. The information may include first information and second information, wherein the first information is supported by the LTE network and not supported by the non-LTE network. The second information may be supported by the LTE network and the non-LTE network. The processor may be configured to send the first information to the LTE network before the scheduled time and send the second information to the non-LTE network after sending the first information.

Implementations of such a mobile device may also, or alternatively, include one or more of the following features. The information may include location information regarding the location of the mobile device. The location information may include reference signal time difference (RSTD) measurement data. The scheduled time may be an early time or a final time associated with a long term evolution (LTE) positioning protocol (LPP). The processor may be configured to receive, from the server and via the transceiver, a request for the information. The processor may be configured to determine that a trigger condition is met in response to receiving the request for the information. The processor may be further configured to periodically send, to the server via the transceiver, measurement reports prior to determining that the trigger condition is met.

An example of a non-transitory, processor-readable storage medium may include processor-readable instructions configured to cause a processor of a mobile device to obtain a scheduled time to send information to a server; determine that a trigger condition is met before the scheduled time; and send at least a portion of the information from the mobile device to the server, in response to determining that the trigger condition is met before the scheduled time.

Implementations of such a mobile device may include one or more of the following features. The information may include location information regarding the location of the mobile device. The location information may include reference signal time difference (RSTD) measurement data. The scheduled time may be an early time or a final time associated with a long term evolution (LTE) positioning protocol (LPP).

An example of a mobile device for sending information to a server includes means for obtaining a schedule time to send the information to the server; means for determining that a trigger condition is met before the scheduled time; and means for sending at least a portion of the information from the mobile device to the server, in response to the trigger condition before the schedule time.

Implementations of such a mobile device may include one or more of the following features. The information may include location information regarding the location of the mobile device. The location information may include reference signal time difference measurement (RSTD) data. The scheduled time may be an early time or a final time associated with a long term evolution (LTE) positioning protocol (LPP).

Items and/or techniques described herein may provide one or more of the following capabilities, as well as other capabilities not mentioned. Information, such as location information, can be sent from a mobile device to a server even in situations where a condition would prevent the mobile device from sending the information at the scheduled time. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed herein for sending information from a mobile device to a server prior to a scheduled time at which the information is scheduled to be sent to the server. For example, in the LTE Positioning Protocol (LPP) an early time and a final time are two scheduled times for reporting location information to a location server. Situations may arise, however, that prevent the mobile device from sending the location information to the location server. If the mobile device is able to determine when such a situation is about to occur, then the mobile device can send the location information to the server at a time earlier than the scheduled times. While specific implementations of this technique are described in connection with LPP and location information, these examples are not limiting. Similar techniques may be used for any type of information that is scheduled to be sent from a mobile device to a server. For example, the mobile device may collect usage data and report usage data back to a server at a scheduled time. The mobile device may send the usage data to the server prior to the scheduled time when a trigger condition occurs.

Figure 1:
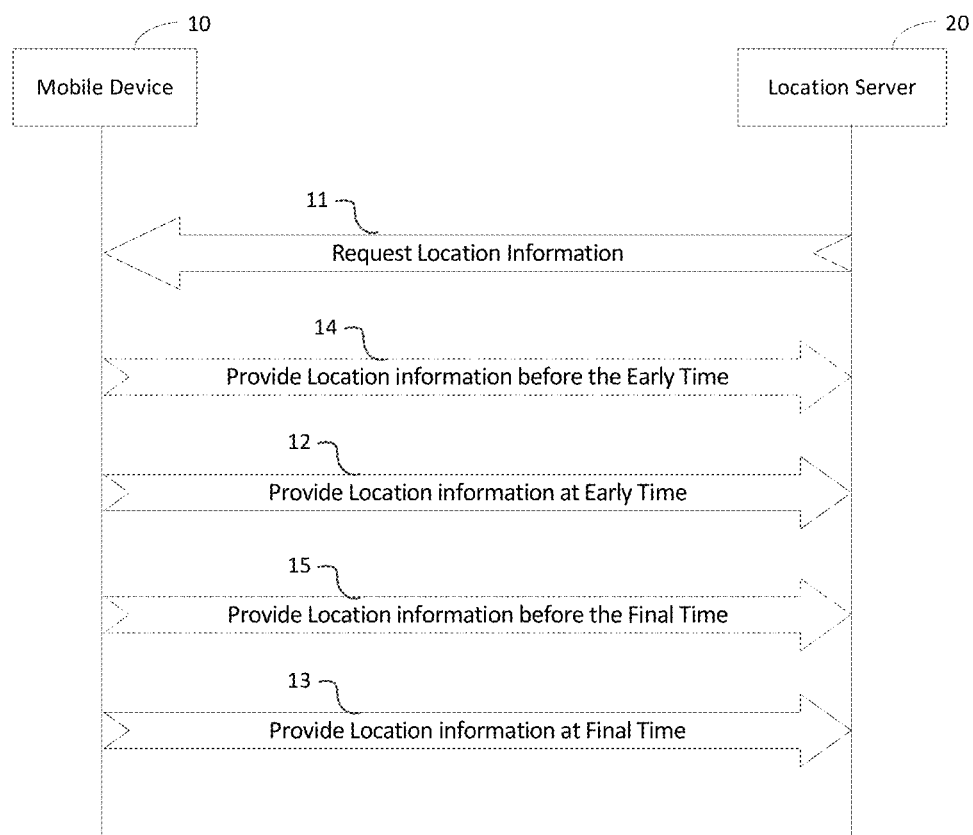
FIG. 1 is a call flow diagram between a mobile device and a location server.

Referring to FIG. 1, a mobile device 10 and a location server 20 send and receive message when implementing LPP. Only a portion of the communications between the mobile device 10 and the location server 20 are shown in FIG. 1. The location server 20 sends a request 11 for location information to the mobile device 10. There are two scheduled times at which the mobile device 10 is scheduled to send the location information to the location server 20 an early time and a final time. The two scheduled times may be predetermined such that both the mobile device 10 and the location server 20 know the scheduled times without determining or receiving schedule time information. Alternatively, the location server 20 can determine the scheduled times and send the scheduled times in the request 11 to the mobile device 10. The scheduled times may be determined based on the carrier and/or the application for which the location information is being used (e.g., emergency call may require shorter times). The request for location information may also include observed time difference of arrival (OTDOA) assistance data.

After receiving the request 11 for location information, the mobile device 10 makes location measurements. For example reference signal time difference (RSTD) measurements can be made and saved in a memory of the mobile device 10 as location information until being sent to the location server. The mobile device 10 may also process measured RSTD data and save the resulting information as location information in memory. Thus, location information may refer to measured location data or information resulting from processing measured location data.

When the early scheduled time occurs, the mobile device 10 sends the location information to the location server in a message 12. When the final scheduled time occurs, the mobile device 10 sends the location information to the location server in a message 13. The location information associated with the early scheduled time is potentially less accurate than the location information associated with the final scheduled time, but sending the location information at the early scheduled time provides some indication of the positioning of the mobile device relatively quickly. By way of example, the early scheduled time may be between one and two seconds after receiving the request 10 for location information and the location information determined from this early location information may have a positioning accuracy of approximately 1000 meters, where the final scheduled time may be between twenty and forty seconds after receiving the request 10 for location information and the location information determined from this final location information may have a positioning accuracy of approximately 50 meters.

If the mobile device 10 becomes unable to send the location information to the location server 20 before the early scheduled time or the final scheduled time, then the measured location information will be unavailable for use by the location server. However, if the mobile device 10 is able to send the location information saved in memory before becoming unable to send the location, then the location server 20 could still use that location information. Consequently, the mobile device 10 determines when the mobile device 10 is likely to become unable to send the location information to the location server and, in response to making the determination that loss of the ability to send the location information is imminent, the mobile device 10 sends the location information to the location server 20 at a time prior to the scheduled time. For example, if the mobile device 10 determines that it will likely become unable to send the location information to the location server 20 before the early scheduled time, then the mobile device 10 sends the location information to the location server 20 before the early scheduled time in a message 14. If the mobile device 10 determines that it will likely become unable to send the location information to the location server 20 before the final scheduled time but after the early scheduled time, then the mobile device 10 sends the location information to the location server 20 before the final scheduled time in a message 15. In FIG. 1, messages 11, 12 and 13 are illustrated with solid lines to indicate that they are part of the standard LPP implementation, whereas messages 14 and 15 are illustrated with dashed lines to indicate that they are optionally sent in response to the mobile device 10 determining that a trigger condition occurs.

Figure 2:
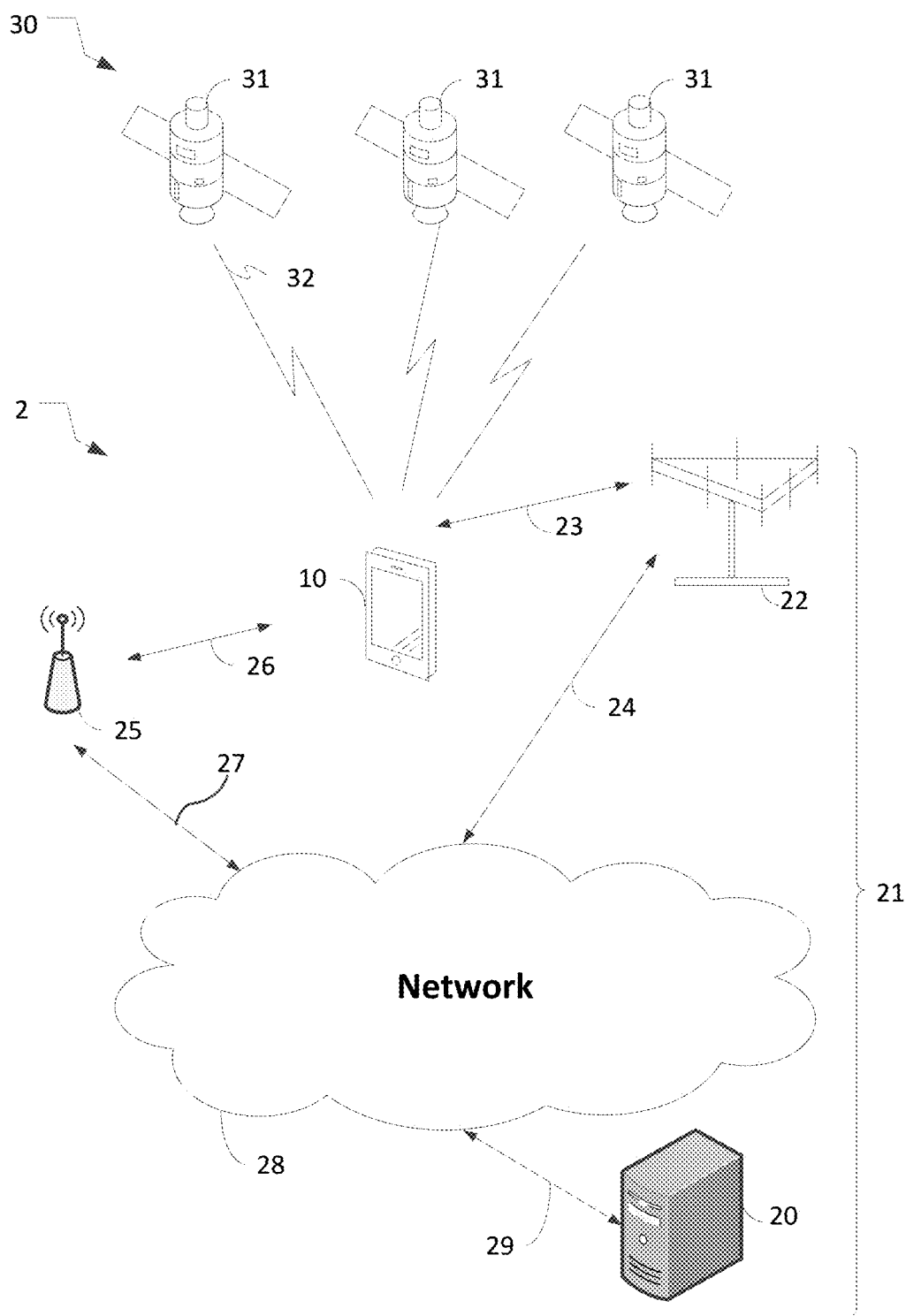
FIG. 2 is a simplified diagram of a communications environment.

Referring to FIG. 2, the mobile device 10 is able to communicate with various devices within an environment 2, which includes a wireless network 21 and a satellite positioning system (SPS) 30 including SPS satellites 31. The environment 2 is an example, and other environment configurations may be used. The SPS 30 may be a Global Positioning System (GPS), Global Navigation Satellite System (GNSS), Galileo, GLONASS, Beidou (Compass), etc. The SPS satellites 31 may be referred to as satellites, space vehicles (SVs), etc. The wireless communication network 21 includes the mobile device 10, a base station 22, a local transceiver 25, a network 28, and the location server 20. The network 28, while not necessarily wireless itself, may comprise cellular communication network infrastructure and is therefore considered part of the wireless communication network 21. The mobile device 10 may transmit radio signals to, and receive radio signals from, one or more base stations in the wireless communication network 21. For example, the mobile device 10 may communicate with a cellular communication network by transmitting wireless signals to, or receiving wireless signals from, the base station 22 which may include a wireless base transceiver station (BTS), a Node B, an evolved NodeB (eNB), etc., over a wireless communication link 23. Similarly, mobile device 10 may transmit wireless signals to, or receive wireless signals from, the local transceiver 25 over wireless communication link 26. The local transceiver 25 (which may also be considered a "base station" herein) may comprise a Wi-Fi access point (AP), femtocell, Home Base Station, small cell base station, Home Node B (HNB) or Home eNodeB (HeNB) and may provide access to a wireless local area network (WLAN, e.g., Institute of Electrical and Electronics Engineers (IEEE) 802.11 network), a wireless personal area network (WPAN, e.g., Bluetooth® network or ZigBee® network) or a cellular network (e.g. an LTE network or other wireless wide area network such as those discussed in the next paragraph). These are examples of networks that may communicate with the mobile device 10 over a wireless link, and claimed subject matter is not limited in this respect. Further, while only one base station 22, one local transceiver 25, and one location server 20 are shown, more than one base station and/or more than one local transceiver and/or more than one server may be used.

Examples of network technologies that may support the wireless communication link 23 are Global System for Mobile Communications (GSM), Code Division Multiple Access (CDMA), Wideband CDMA (WCDMA), Long Term Evolution (LTE), and High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Base station 22 may comprise deployments of equipment providing subscriber access to a wireless telecommunication network for a service (e.g., under a service contract with a carrier). Here, a transceiver of the base station 22 may perform functions of a cellular base station in servicing subscriber devices within a cell determined based, at least in part, on a range at which the base station 22 is capable of providing access service. Examples of radio technologies that may support wireless communication link 26 with local transceiver 25 are IEEE 802.11, Bluetooth (BT) and LTE.

The base station 22 and the local transceiver 25 may communicate with the server 20 over the network 28. Here, the network 28 is communicatively coupled to the base station 22 via link 24, the local transceiver 25 via link 27, and the server 20 via link 29. Links 24, 27 and 29 may be wired and/or wireless links and enable communication between the base station 22, the local transceiver 25 and the location server 20. The network 28 may utilize Internet Protocol (IP) or other communication protocols to convey data packets between devices linked to the network. The network 28 comprises infrastructure capable of facilitating communication between mobile device 10 and location server 20 through local transceiver 25 and/or base station 22. The network 28 may comprise cellular communication network infrastructure such as, for example, a base station controller or packet based or circuit based switching center (not shown) to facilitate mobile cellular communication with mobile device 10. Also or alternatively, the network 28 may comprise local area network (LAN) elements such as wireless LAN access points (WLAN APs), routers and bridges and may include or have links to gateway elements that provide access to wide area networks such as the Internet.

The network 28 may comprise multiple networks (e.g., one or more wireless networks and/or the Internet). The network 28 may include one or more serving gateways or Packet Data Network gateways.

As described in more detail below, the mobile device 10 may have circuitry and processing resources capable of obtaining location-related measurements (e.g., for the signals 32 received from the SPS satellites 31, the base station 22 and/or the local transceiver 25) and computing a position fix or estimated location of the mobile device 10 based on these location-related measurements. Location-related measurements obtained by the mobile device 10 may include measurements of the SPS signals 32 received from the SPS satellites 31, signals (such as signals over the wireless communication link 23 and/or the wireless communication link 26) received from terrestrial transmitters fixed at known locations (e.g., the base station 22 and the local transceiver 25). Location-related measurements obtained by the mobile device 10 may be transferred to the location server 20, and the location server 20 may estimate or determine a location for the mobile device 10 based on the measurements. The mobile device 10 or the location server 20 may obtain a location estimate for the mobile device 10 based on these location-related measurements using any one of several known positioning methods such as trilateration or multilateration.

The server 20 may be any of a variety of server types. For example, the server 20 may be a location server such as an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 28.

The location server 20 may be capable of providing positioning assistance data to mobile device 10. For example, positioning assistance data may include information regarding signals to be measured (e.g., signal timing such as the aforementioned scheduled signal times), locations and identities of terrestrial transmitters, and/or timing and orbital information for SPS satellites 31. The server may send a request 11 for location information to the mobile device 10. The mobile device 10, as discussed further below, is configured to make RSTD measurements and send location information based on those measurements back to the location server 20. The mobile device 10 is also configured to monitor the strength and quality of wireless signals 23 and 26 to determine whether connection to the base station 22 or the local transceiver 25 is likely to be lost.

Figure 3:
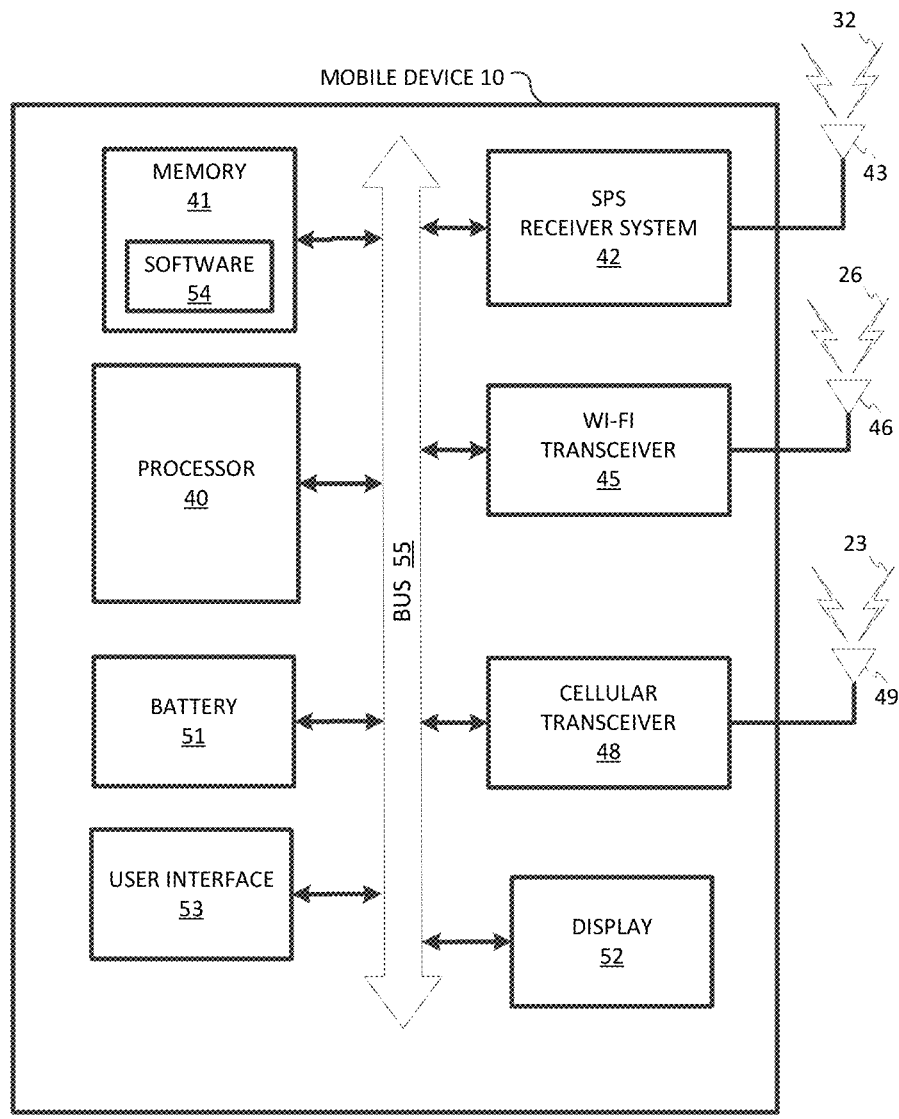
FIG. 3 is a block diagram of a mobile device that may operate in the communications environment of FIG. 1

Referring to FIG. 3, the mobile device 10 is a computer system that includes a processor 40, a memory 41, an SPS receiver system 42, a Wi-Fi transceiver 45, a cellular transceiver 48, a battery 51, a display 52, a user interface 53, and a bus 55. The processor 40 is an intelligent device, e.g., a central processing unit (CPU) such as those made or designed by Qualcomm®, ARM®, Intel® Corporation, or AMD®, a microcontroller, an application specific integrated circuit (ASIC), etc. The memory 41 is non-transitory, processor-readable memory that stores instructions that may be executed by processor 40 and includes random access memory (RAM), read-only memory (ROM) and non-volatile memory such as flash memory or solid state storage. The SPS receiver system 42 receives signals 32 from SPS satellites 31 (see FIG. 2) via SPS antenna 43. The Wi-Fi transceiver 45 sends and receives signals 26 to and from base station 22 (see FIG. 2) via Wi-Fi antenna 46. The cellular transceiver 48 sends and receives signals 23 to and from base station 22 via cellular antenna 49. The Wi-Fi transceiver 45 and the cellular transceiver 48 communicatively couple the mobile device 10 to the server 20 via the network 28. The battery 51 provides power to the various components of the mobile device 20, and the power-level of the battery 51 may be monitored by processor 40 to determine if the mobile device 10 will shut down. The display 52 may be a liquid-crystal display (LCD) (e.g., a thin-film transistor (TFT) display), although other forms of displays are acceptable. The user interface 53 provides data input mechanisms for a user (not shown) and may be a keypad, buttons, a touch screen (in which case display 52 and user interface 53 may be the same device), or a microphone configured to receive voice commands from the user. Software 54 can be loaded onto the memory 41 by being downloaded via a network connection, uploaded from a disk, etc. Further, the software 54 may not be directly executable, e.g., requiring compiling before execution. The software 54 includes instructions configured to cause the processor 40 to perform functions described below. The various components of the mobile device 10 are communicatively coupled to one another via bus 55.

The processor 40 is communicatively coupled to both the Wi-Fi transceiver 45 and the cellular transceiver 48 via bus 55. The processor 40 is configured to obtain a scheduled time to send information to the server 20. The scheduled time can be stored in memory 41 and retrieved via bus 55. The scheduled time can be predetermined (e.g., set as part of a standard protocol) or received in a message from the server 20. Furthermore, more than one scheduled time may be obtained, such as a scheduled early time and a scheduled final time, as defined by the LTE standard. The processor 40 is configured to schedule the sending of the information at the scheduled time.

The processor 40 is further configured to determine that a trigger condition is met before the scheduled time. Determining that a trigger condition is met may be based on input from user interface 53, data indicative of the power level of battery 51, data received from cellular transceiver 48, data received from Wi-Fi transceiver 45 and/or data received from SPS receiver system 42. By way of example and not limitation, the processor 40 can determine that a trigger condition is met by determining that the mobile device 10 is likely to lose a connection to a wireless network 21 (see FIG. 2) before the scheduled time. The processor 40 may receive data via bus 55 and monitor the data to determine if the data is indicative of a loss of connection to wireless network 21. The processor 40 may determine that a trigger condition is met by determining that data values exceed a threshold, drop below a threshold or are equal to a particular value. Furthermore, the processor 40 may perform operations on received data to calculate some other data values to be used for making the determination that a trigger condition is met. For example, the processor 40 may base the determination that a trigger condition is met on moving averages of received data or a signal to noise ratio determined from multiple data points.

The processor 40 may be configured to monitor data such as Received Strength Signal Indicators (RSSIs), Reference Signal Received Power (RSRP), Reference Signal Received Quality (RSRQ), Signal-to-Interference-plus-noise Ratio (SINR), Energy per Chip to Interference Power Ratio (Ec/Io), battery status and battery consumption rate, etc. The processor 40 of the mobile device 10 may, for example, be configured to monitor and analyze the RSRP and/or RSRQ values to determine whether the mobile device 10 is moving out of an area of coverage to an area with no coverage. The processor 40 is configured to determine that a trigger condition is met by determining that the RSRQ value drops below a first threshold and/or the RSRP drops below a second threshold. The threshold values may be static values stored in memory 41. Alternatively, the processor 40 may be configured to dynamically determine the threshold values based on the rate of change of the RSRP and/or RSRQ values. For example, the processor 40 may set the threshold higher when the processor 40 determines that the RSRP or RSRQ values are decreasing at a fast rate than when the processor 40 determines that RSRP or RSRQ values are decreasing at a slow rate. A higher threshold will provide additional time for the mobile device 10 to send the location information to the server prior to losing the connection. Hence, in one embodiment, determining that the mobile device is likely to lose the connection to a wireless network comprises determining that a signal strength indicator, for example RSSI, is below a signal strength threshold, for example −80 dBm, −85 dBm, or −90 dBm, and/or a signal quality indicator, for example RSRP or RSRQ, is below a signal quality threshold, for example −100 dBm, −110 dBm, −120 dBm, or −125 dBm for RSRP, or −15 dB, −17 dB, or −19 dB for RSRQ. It is understood that example values for signal strength and signal quality thresholds are illustrative, and that actual thresholds may depend upon antenna sensitivity, or other factors, in various implementations. The thresholds may be dependent on the mobile device, a band class and/or a bandwidth of the network connection. Also or alternatively, the processor 40 may be configured to predict future RSRP and/or RSRQ values based on present values and a respective trend or pattern of the values, and determine that a trigger condition is met if a predicted future RSRP value and/or a predicted RSRQ value is below a respective threshold or combination of thresholds. The processor 40 of the mobile device 10 may be configured to inhibit or prevent false determinations of trigger conditions, where the processor 40 determines that a trigger condition is met when the loss of the wireless connection is not likely. Such false determinations of trigger conditions being met may occur due to sudden signal blockages that may cause abrupt signal variations but do not represent an actual loss of the wireless connection. For example, the processor 40 may be configured to use a moving average of the RSRP or RSRQ values or using a filter to suppress the effects of sudden decreases in the RSRP or RSRQ values in order to require a continuous decrease in the RSRP or RSRQ values for a trigger condition to be met.

Alternatively, or additionally, the processor 40 may be configured to base the determination that the mobile device 10 is likely to lose connection with the wireless network 21 on an indicator of the power of the battery 51 of the mobile device 10. In this case, the processor 40 is configured to monitor and analyze the power level of the battery 51. The processor 40 may be configured to determine that a trigger condition is met when the battery power decreases below a threshold value. Also or alternatively, the processor 40 may be configured to predict, based on measured data tracking the battery power, whether the mobile device 10 will have insufficient battery power to maintain the connection to the wireless network 21 until the scheduled time. In this case, the processor 40 is configured to determine that the mobile device 10 is likely to lose the connection to the wireless network 21, i.e., that a trigger condition is met, if the power of battery 51 is predicted to be insufficient by the scheduled time.

The processor 40 may also be configured to base its determination that the mobile device 10 is likely lose the connection to wireless network 21 on discrete indicators that indicate that a particular event has occurred or will occur. For example, the cellular transceiver 48 may receive an indication from the base station 22 of the wireless network 21 (i.e., a first wireless network) that a handover is about to occur to a different network (i.e., a second wireless network) that uses a different radio access technology (RAT) (i.e., an inter-RAT (IRAT) handover). For example, the first wireless network may be an LTE network and the second wireless network may be a non-LTE network. The processor 40 may be configured to receive the handover indication from the cellular transceiver 48 and determine that a trigger condition is met. In such a situation, the cellular transceiver 48 may stop communicating with the LTE network and begin communication with the non-LTE network. The location information is sent to the location server 20 (see FIG. 2 or FIG. 4) before communication with the LTE network ceases. Alternatively, the user of mobile device 10 may manually select an option, via user interface 53, to force the mobile device 10 to switch from the LTE network to a non-LTE network. The processor 40 may be configured to receive an indication of the user selection and determine that a trigger condition is met. Another alternative is that the user of the mobile device 10 manually instructs, via the user interface 53, the mobile device 10 to shut down. The processor 40 may be configured to receive an indication of the user's instruction and determine that a trigger condition is met. The processor 40 may be configured to use any or all of the above discrete indicators to determine that loss of the wireless connection is likely and determine that a trigger condition is met.

In the case where the processor 40 determines that a trigger condition is met in response to receiving notification of an IRAT handover, the mobile device 10 need not send all measurements to the location server 20. Instead, a first portion of the information can be prioritized and sent first, while a second portion of the information may be sent after the first portion of the information is sent. For example, when the processor 40 determines that a handover from a first network to a second network is going to occur, the processor may determine the positioning capabilities of the second network and only send, before the scheduled time, the measurements corresponding to positioning capabilities that are not supported by the second network. The measurements associated with positioning techniques that are supported by the second network can be sent at any later time, after the measurement that are not supported are sent, including after the handover occurs. By way of example and not limitation, the mobile device 10 may determine that a handover is going to occur from an LTE network to a WCDMA network. The LTE network supports multiple positioning techniques, such as GNSS-based positioning, Wi-Fi-based positioning, and OTDOA-based positioning based on RSTD measurements, while the WCDMA network only supports GNSS-based positioning. Thus, the information being sent to the location server includes first information (e.g., Wi-Fi-based positioning measurements, and OTDOA-based positioning based on RSTD measurements) and second information (e.g., GNSS-based positioning measurements). The processor 40 may send the first information, including the Wi-Fi measurements associated with Wi-Fi-based positioning and RSTD measurements, to the location server 20 before the scheduled time in response to determining that the trigger condition is met. The second information, including the GNSS-related measurements, is not sent immediately but is send after sending the first information. For example, the second information can be sent to the location server 20 at the later scheduled time using the first network before the handover occurs or using the second network after the handover occurs. In another example, the mobile device 10 may determine that a handover is going to occur from a first LTE network that supports LPP, which supports OTDOA measurements, to a second LTE network that supports radio resource location services protocol (RRLP), which does not support OTDOA measurements. The information being sent to the location server includes first information that includes the OTDOA measurements and second information that includes other measurements that are supported by the second LTE network, such as GNSS positioning information.

The processor 40 may also be configured to determine that loss of the connection to the wireless network 21 is likely based on the effect of operating two RATs on a single receiving chain. For example, the cellular transceiver 48 may support a first RAT and a second RAT, or there may be more than one cellular transceiver, each configured to support a different RAT. The processor 40 may be configured to determine that a trigger condition is met when an action associated with the first RAT results in a decrease in signal on the second RAT. The action associated with the first RAT may include receiving an indication of an incoming call. For example, if the processor 40 is making RSTD measurements using an LTE RAT and a call is incoming on a non-LTE RAT, the LTE connection will be lost to establish the non-LTE call. Thus, the processor 40 may receive an indication of the incoming non-LTE RAT call and, in response, determine that a trigger condition is met. In such a situation, the cellular transceiver 48 may stop communicating with the LTE network and begin communication with the non-LTE network. The location information is sent to the location server 20 before communication with the LTE network ceases prior to the scheduled time. A specific example of the above situation is a mobile device 10 in a dual SIM (subscriber identity module), dual standby dual subscriber (DSDS) mode and the first RAT is WCDMA, GSM, or CDMA (or any non-LTE RAT) and the second RAT is LTE. If the OTDOA measurements associated with LPP are being performed on the LTE RAT when an incoming call is received on the, for example, CDMA RAT, the processor 40 determines that loss of the connection to the wireless network 21 (specifically, the LTE network) is likely. A further example of the above situation is a mobile device 10 in single SIM, single subscriber (SS) mode and the mobile device 10 is in circuit switch fallback mode (CFSB) mode or single receiver LTE (SRLTE) mode. In this case, the single SIM is capable of monitoring both an LTE network and a non-LTE network and an incoming call on the non-LTE network will cause a loss of connection to the LTE network.

While the above examples of operating two RATs on a single receiving chain were discussed in connection with receiving an incoming call causing the mobile device 10 to determine that loss of the connection to the wireless network 21 is likely, the same applies to outgoing calls. If the user of the mobile device 10 uses the user interface 53 to place an outgoing call on a non-LTE network, the processor 40 may receive an indication of the outgoing call and determine that the connection to the LTE network will be lost. Thus, the processor 40 is configured to determine that a trigger condition is met when the processor 40 receives the indication of the user placing an outgoing call.

The processor 40 may also be configured to base the determination that a trigger condition is met on positioning information and historical data. For example, the SPS receiver system 42 may receive SPS signals and send SPS data to the processor 40 via bus 55. The processor 40 may be configured to determine the location of the mobile device 10 from the SPS data, or the SPS receiver system 42 may determine the location of the mobile device 10 and pass the location information to the processor 40. The mobile device 10 may also maintain, in memory 41, historical data related to the locations that the mobile device 10 has lost a connection to the wireless network 21. The processor 40 is configured to determine that the mobile device 10 is approaching a threshold distance from such a location and, in response, determine that a trigger condition is met. Additionally, the mobile device 10 may receive information from the location server 20 (or any other source), via Wi-Fi transceiver 45 or cellular transceiver 48, regarding where other mobile devices have lost a connection with the wireless network 21. The processor 40 may be configured to use this crowd-sourced information about the locations where network connections are likely to be lost to determine if the mobile device 10 is likely to lose a connection to the network based on the current location of the mobile device 10. The processor 40 may further be configured to base the determination that a trigger condition is met on the direction and/or speed of travel of mobile device 10.

The processor 40 may be configured to determine that a trigger condition is met based on information received from the location server 20. The location server 20 may be configured to make a determination that the mobile device's connection to the wireless network 21 is likely to be lost based on information sent to the location server 20 by the mobile device 10 via the Wi-Fi transceiver 45 or the cellular transceiver 48. For example, at any time prior to determining that a trigger condition is met, the mobile device may periodically send measurement reports to the location server 20 via the Wi-Fi transceiver 45 or the cellular transceiver 48. The measurement reports can include information indicative of whether the mobile device 10 is likely to lose a connection to the wireless network 21 before one of the scheduled times. For example, the processor 40 may be configured to periodically send RSSI measurements, RSRP measurements, RSRQ measurements, SINR measurements and/or Echo measurements to the location server 20, which the processor 60 of the location server 20 may then use to determine whether loss of the connection of the mobile device 10 to the wireless network 21 is likely. Additionally, the location server 20 may receive information from the base station 22 servicing the mobile device 10 regarding signal power, signal quality, and/or whether handover to a non-LTE network is planned. Hence, in one embodiment, determining that the mobile device is likely to lose the connection to a wireless network comprises determining that a signal strength indicator is below a signal strength threshold, for example −80 dBm, −85 dBm, or −90 dBm, and/or a signal quality indicator, for example RSRP or RSRQ, is below a signal quality threshold, for example −100 dBm, −110 dBm, −120 dBm, or −125 dBm for RSRP, or −15 dB, −17 dB, or −19 dB for RSRQ. It is understood that example values for signal strength and signal quality thresholds are illustrative, and that actual thresholds may depend upon antenna sensitivity in various implementations. The thresholds may be dependent on the mobile device, a band class and/or a bandwidth of the network connection. After making the determination that the mobile device 10 is likely to lose connection to the wireless network 21, the location server 20 may send a message to the mobile device 10 requesting the location information from the mobile device 10. The message may implicitly request the location information from the mobile device 10 by indicating that the wireless connection is likely to be lost. Alternatively, the message may implicitly indicate that the wireless connection is likely to be lost by requesting the location information. The processor 40 of the mobile device 10 may be configured to determine that a trigger condition is met when the request for the location information is received from the location server 20, or may simply respond to the request by sending the requested information.

Figure 4:
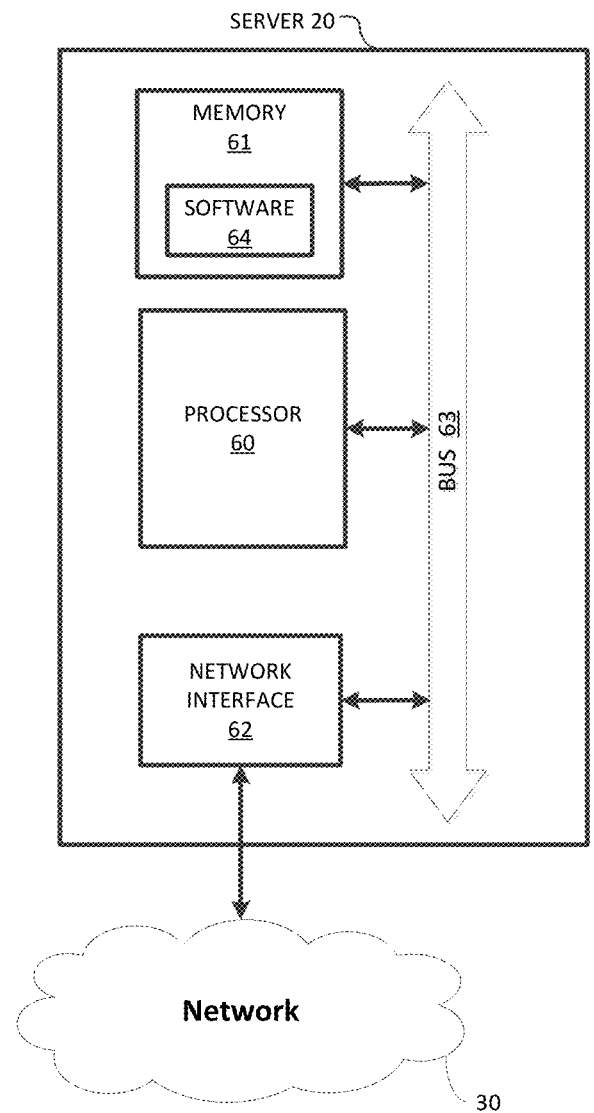
FIG. 4 is a block diagram of a server that may operate in the communications environment of FIG. 1.

Referring to FIG. 4, the location server 20 is a computer system that includes a processor 60, a memory 61, a network interface 62, and a bus 63. The processor 60 is an intelligent device, e.g., a central processing unit (CPU) such as those made or designed by Qualcomm®, ARM®, Intel® Corporation, or AMD®, a microcontroller, an application specific integrated circuit (ASIC), etc. The memory 61 is non-transitory, processor-readable memory that stores instructions that may be executed by processor 60 and includes random access memory (RAM), read-only memory (ROM) and non-volatile memory such as hard disk drives, flash memory or solid state storage. Software 64 can be loaded onto the memory 61 by being downloaded via a network connection, uploaded from a disk, etc. Further, the software 64 may not be directly executable, e.g., requiring compiling before execution. The network interface 62 sends signal to and receives signals from the mobile device 10 (see FIG. 2 or FIG. 3), base station 22 (see FIG. 2) and local transceiver 25 (see FIG. 2) via network 30.

The processor 60 may be configured to send a request for location information to the mobile device 10 via network interface 62. The request may include one or more scheduled times at which the mobile device 10 is expected to return the location information. The processor 60 may also be configured to receive, periodically or randomly, data from the mobile device 10 and use these data to determine if a connection to the wireless network 21 is likely. The processor 60 may be configured to determine whether a trigger condition occurs based on the received data, in a similar way that the mobile device 10 is described above as determining whether a trigger condition occurs. The processor 60 may be configured to send, via network interface 62, an indication to the mobile device that the mobile device 10 is likely to lose the connection to the wireless network 21. The processor 60 may be configured to receive the location information form the mobile device 10 before the scheduled time.

Figure 5:
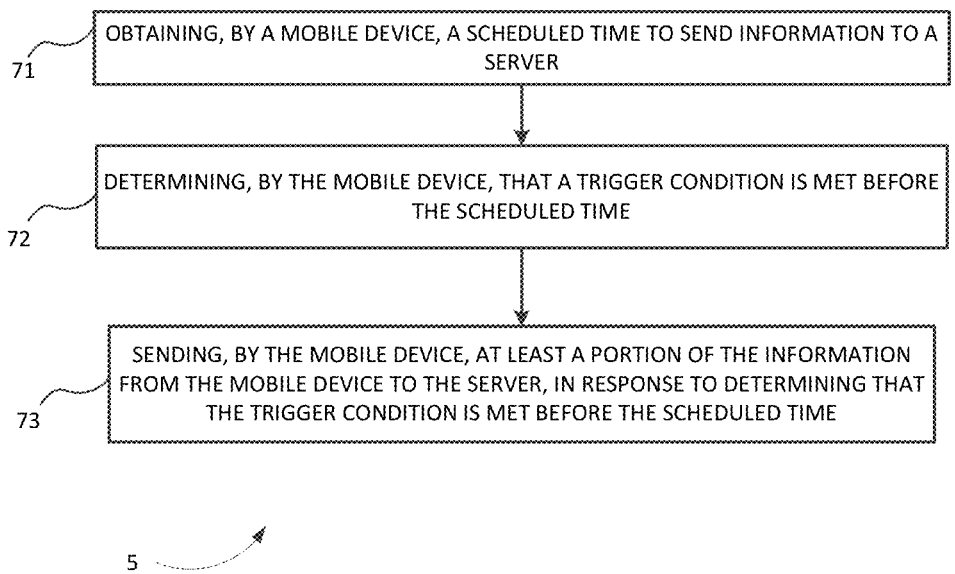
FIG. 5 is a flow diagram of a method of operating the mobile device of FIG. 3.

Referring to FIG. 5, with further reference to FIGS. 1-4, a method 5 of sending information from a mobile device 10 to a server 20 includes the stages shown. The method 5 is, however, an example only and not limiting. The method 5 can be altered, e.g., by having stages added, removed, rearranged, combined, performed concurrently, and/or having single stages split into multiple stages.

At stage 71, the method 5 includes obtaining, by the mobile device 10, a scheduled time to send the information to the server 20. In an example, means for obtaining the scheduled time can comprise any combination of the antenna 49, the cellular transceiver 48, the processor 40, the memory 41 and the software 54. The scheduled time may be received in a message from the server 20 that requests the location information. The message may include more than one scheduled time to send information to the server. For example, the message may include an early scheduled time and a final scheduled time. Alternatively, the scheduled time may obtained from memory 41 of the mobile device 10, in which case the scheduled time is pre-arranged such that both the mobile device 10 and the server 20 know the scheduled time without the need for explicitly including it in the message. Once the scheduled time is obtained, the processor 40 may schedule the sending of the information at the scheduled time.

At stage 72, the method 5 includes determining, by the mobile device, that a trigger condition is met before the scheduled time. In an example, means for determining that a trigger condition is met can comprise any combination of the processor 40, the memory 41 and the software 54. There are various ways in which the mobile device 10, using processor 40, may determine that a trigger condition is met before one of the scheduled times for sending information back to the server. For example, a trigger condition may be met when it is determined that the mobile device 10 is likely to lose a connection to a wireless network 21 before one of the scheduled times. Determining that loss of the connection is likely may be achieved by monitoring and analyzing data indicative of an ability of maintaining a connection to the wireless network 21 and determining that the data is above or below a threshold. For example, the processor 40 may monitor and analyze Receive Strength Signal Indicators (RSSIs), Reference Signal Received Power (RSRP), Reference Signal Received Quality (RSRQ), Signal to Interference-plus-noise Ratio (SINR), Ec/Io, battery status and battery consumption rate, etc.

The processor 40 of the mobile device 10 may, for example, monitor the RSRP and/or RSRQ values to determine whether the mobile device 10 is moving out of an area of coverage to an area with no coverage. The processor 40 may determine that a trigger condition is met if the processor 40 determines that the RSRQ value drops below a first threshold and/or the RSRP drops below a second threshold. The threshold values may be static values. Alternatively, the threshold values may be dynamic and based on the rate of change of the RSRP and/or RSRQ values. For example, the if RSRP or RSRQ values are decreasing at a fast rate, the threshold may be set higher than when the RSRP or RSRQ values are decreasing at a slow rate. A higher threshold will provide additional time for the mobile device 10 to send the location information to the server prior to losing the connection. Also or alternatively, the processor 40 may predict future RSRP and/or RSRQ values based on present values and a respective trend or pattern of the values, and determine that a trigger condition is met if a predicted future RSRP value and/or a predicted RSRQ value is below a respective threshold or combination of thresholds. The processor 40 of the mobile device 10 may also include a mechanism to inhibit or prevent false determinations of trigger conditions, due to sudden signal blockages that may cause abrupt signal variations but do not represent an actual loss of the wireless connection. For example, the processor 40 may require a continuous decrease in the RSRP or RSRQ values to determine that a trigger condition is met by using a moving average of the RSRP or RSRQ values or using a filter to ignore sudden decreases in the RSRP or RSRQ values.

Alternatively, or additionally, the data indicative of the likelihood of maintaining a connection may be an indicator of the power of the battery 51 of the mobile device 10. The processor 40 of the mobile device 10 monitors the power level of the battery 51. The processor 40 may respond to the battery power decreasing below a threshold value by determining that a trigger condition is met. Alternatively, the processor 40 may predict, based on measured data tracking the battery power, whether the mobile device 10 will have insufficient battery power to maintain the connection to the wireless network 21 at the scheduled time. If the power of battery 51 is predicted to be insufficient at the scheduled time, then the processor 40 determines that the mobile device 10 is likely to lose the connection to the wireless network 21, i.e., that a trigger condition is met.

Determining that loss of the connection to the wireless network 21 is likely is not limited to comparing data to a threshold value. Indicators of loss of connection may also be discrete indicators that indicate that a particular event has occurred or will occur. For example, the mobile device 10 may receive an indication from the base station 22 of the wireless network 21 (i.e., a first wireless network) that a handover is about to occur to a different network (i.e., a second wireless network) that uses a different radio access technology (RAT) (i.e., an inter-RAT (IRAT) handover). For example, the first wireless network may be an LTE network and the second wireless network may be a non-LTE network. Alternatively, the mobile device 10 may receive an indication that the user of the mobile device 10, via user interface 53, manually selected that the mobile device 10 should switch from the LTE network to a non-LTE network. Another alternative is the mobile device 10 receiving an indication that the user of the mobile device 10, via the user interface 53, manually instructed the mobile device 10 to shut down. Any of the above discrete indicators that loss of the wireless connection is likely results in the processor 40 determining that a trigger condition is met.

Determining that loss of the connection to the wireless network 21 is likely may also be based on the effect of operating two RATs on a single receiving chain. For example, a mobile device 10 may support a first RAT and a second RAT using a single cellular transceiver 48. The mobile device 10 may determine that a trigger condition is met when an action associated with the first RAT results in a decrease in signal on the second RAT. The action associated with the first RAT may include receiving an indication of an incoming call. For example, if the mobile device 10 is making RSTD measurements using an LTE RAT and a call is incoming on a non-LTE RAT, the LTE connection will be lost to establish the non-LTE call. Thus, the mobile device 10 may determine that a trigger condition is met when a call is incoming on the non-LTE RAT, resulting in the mobile device 10 sending the location information to the server 20 prior to the scheduled time. A specific example of the above situation is a mobile device 10 in a dual SIM, DSDS mode and the first RAT is WCDMA, GSM, or CDMA (or any non-LTE RAT) and the second RAT is LTE. If the OTDOA measurements associated with LPP are being performed on the LTE RAT when an incoming call is received on the CDMA RAT, the processor 40 determines that loss of the connection to the wireless network 21 (specifically, the LTE network) is likely. A further example of the above situation is a mobile device 10 in single SIM, single subscriber (SS) mode and the mobile device 10 is in CFSB mode or single receiver LTE (SRLTE) mode. In this case, the single SIM is capable of monitoring both an LTE network and a non-LTE network and an incoming call on the non-LTE network will cause a loss of connection to the LTE network.

While the above examples of operating two RATs on a single receiving chain were discussed in connection with receiving an incoming call causing the mobile device 10 to determine that loss of the connection to the wireless network 21 is likely, the same applies to outgoing calls. If the user of the mobile device 10 uses the user interface 53 to place an outgoing call on a non-LTE network, the connection to the LTE network will be lost. Thus, the processor 40 receives an indication of the user's commands to place an outgoing call and determines that a trigger condition is met.

Determining that loss of the connection to the wireless network 21 is likely may also be based on positioning information and historical data. For example, the mobile device 10 may receive SPS signals via the SPS receiver system 42 and determine the location of the mobile device 10 from those signals. The mobile device 10 may also maintain, in memory 41, historical data related to the locations, in the past, that the mobile device 10 has lost a connection to the wireless network 21. If the mobile device 10 approaches a threshold distance from such a location, the processor 40 of mobile device 10 may determine that a trigger condition is met. Additionally, the mobile device 10 may receive information from the location server 20 (or any other source) regarding where other mobile devices have lost a connection with the wireless network 21. This crowd-sourced information about the locations where network connections are likely to be lost may be used to determine if the mobile device 10 is likely to lose a connection to the network based on the current location of the mobile device 10, and possibly also the direction and/or speed of travel.

Determining that loss of the connection to the wireless network 21 is likely is not limited to being determined by the mobile device 10. The location server 20 may also make such a determination based on information sent to the location server 20 by the mobile device 10. For example, at any time prior to determining that a trigger condition is met, the mobile device may periodically send measurement reports to the location server 20. The measurement reports include information indicative of whether the mobile device 10 is likely to lose a connection to the wireless network 21 before one of the scheduled times. For example, the mobile device 10 may periodically report RSSI measurements, RSRP measurements, RSRQ measurements, SINR measurements and/or Ec/Io measurements to the location server, which the processor 60 of the location server 20 may then use to determine whether loss of the connection of the mobile device 10 to the wireless network 21 is likely. Additionally, the location server 20 may receive information from the base station 22 servicing the mobile device 10 regarding signal power, signal quality, and/or whether handover to a non-LTE network is planned. After making the determination that the mobile device 10 is likely to lose its connection to the wireless network 21, the location server 20 may send a message to the mobile device 10 requesting the location information from the mobile device 10. The message may implicitly request the location information from the mobile device 10 by indicating that the wireless connection is likely to be lost. Alternatively, the message may implicitly indicate that the wireless connection is likely to be lost by requesting the location information. The processor 40 of the mobile device 10 may determine that a trigger condition is met when the request for the location information is received from the location server 20, or may simply respond to the request by sending the requested information.

At stage 73, method 5 includes sending, by the mobile device 10, at least a portion of the information from the mobile device to the server, in response to determining that the trigger condition is met before the scheduled time. In an example, means for sending at least a portion of the information can comprise any combination of the processor 40, the memory 41 and the software 54. As described above, the information may be location information. For example, the location information may be the raw RSTD measurements made by the mobile device 10. Alternatively, the processor 40 of the mobile device 10 may process the RSTD measurements to determine the location of the mobile device 10 using the assistance data received from the location server 20 and send the determined location as the location information. Other types of location measurements may also be sent, such as Wi-Fi-based positioning measurements, SPS positioning measurements or Universal Mobile Telecommunications System (UMTS) measurements. Alternatively, or additionally, information that is not location information may be sent to the location server 20. For example, usage information about the performance of the mobile device 10 may be sent to the server 20. All the information collected by the mobile device 10 may be sent to the server 20, or only a portion of the information collected by the mobile device 10 may be sent to the server 20.

Figure 6:
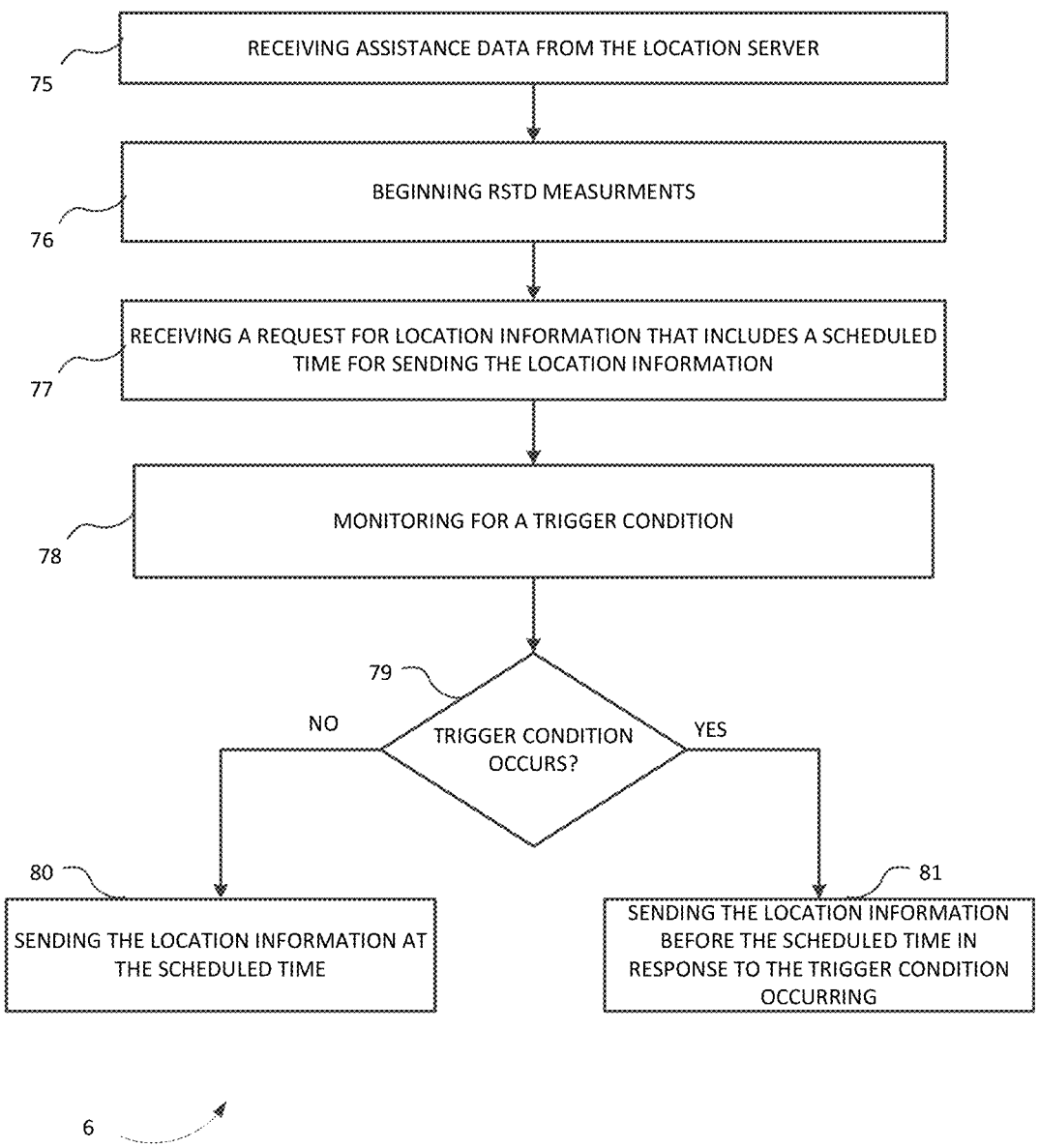
FIG. 6 is a flow diagram of a method of operating the mobile device of FIG. 3.

Referring to FIG. 6, with further reference to FIGS. 1-5, a method 6 of operating a mobile device 10 includes the stages shown. The method 6 is, however, an example only and not limiting. The method 6 can be altered, e.g., by having stages added, removed, rearranged, combined, performed concurrently, and/or having single stages split into multiple stages. For example, stage 76 described below described below can be performed before stage 77. Still other alterations to the method 6 as shown and described are possible.

At stage 75, the method 6 includes receiving assistance data from the location server 20. The assistance data may be information about the positioning reference signals (PRS) send from base station 22 and can assist in performing OTDOA.

At stage 76, the method 6 includes beginning RSTD measurements. The RSTD measurements are made based on signals received from base station 22 and other base stations in the wireless network 21 via cellular transceiver 48. The RSTD measurements are made repeatedly based on when PRS signals are received by the mobile device 10 and data resulting from the measurements is stored in memory 41. The mobile device 10 or the location server 20 can use the measured RSTD data to determine the location of the mobile device 10.

At stage 77, the method 6 includes receiving a request for location information that includes a scheduled time for sending the location information. The request may be received from a location server and include more than one scheduled time. For example, there may be two scheduled times associated with the LPP protocol: the early scheduled time and the final scheduled time. While FIG. 6 illustrates stage 77 occurring after stage 76, the method 6 is not limited as such. There may be situation were the RSTD measurements are not begun until the mobile device 10 receiving the request for location information.

At stage 78, the method 6 includes monitoring for a trigger condition. This stage may be performed at any point during method 6 or throughout the time the mobile device 10 is performing method 6. The monitoring for the trigger condition is described in detail in connection with FIG. 5.

At stage 79, the method 6 includes determining whether a trigger condition occurs. Examples of trigger conditions are described in connection with FIG. 5. If no trigger condition occurs, the method 6 continues to stage 81, which includes sending the location information at the scheduled time. If a trigger condition occurs at stage 79, then the method 6 continues to stage 81, which includes sending the location information before the scheduled time, in response to the trigger condition occurring. As described above, when there is no risk of losing the connection to the wireless network 21, there is no need to send the location information to the server 20 early. Thus, the location information is sent at the scheduled time. When the mobile device 10 determines that the mobile device 10 is likely to lose the connection, then the location data is sent to the location server 20 at a time that earlier than the scheduled time.

Figure 7:
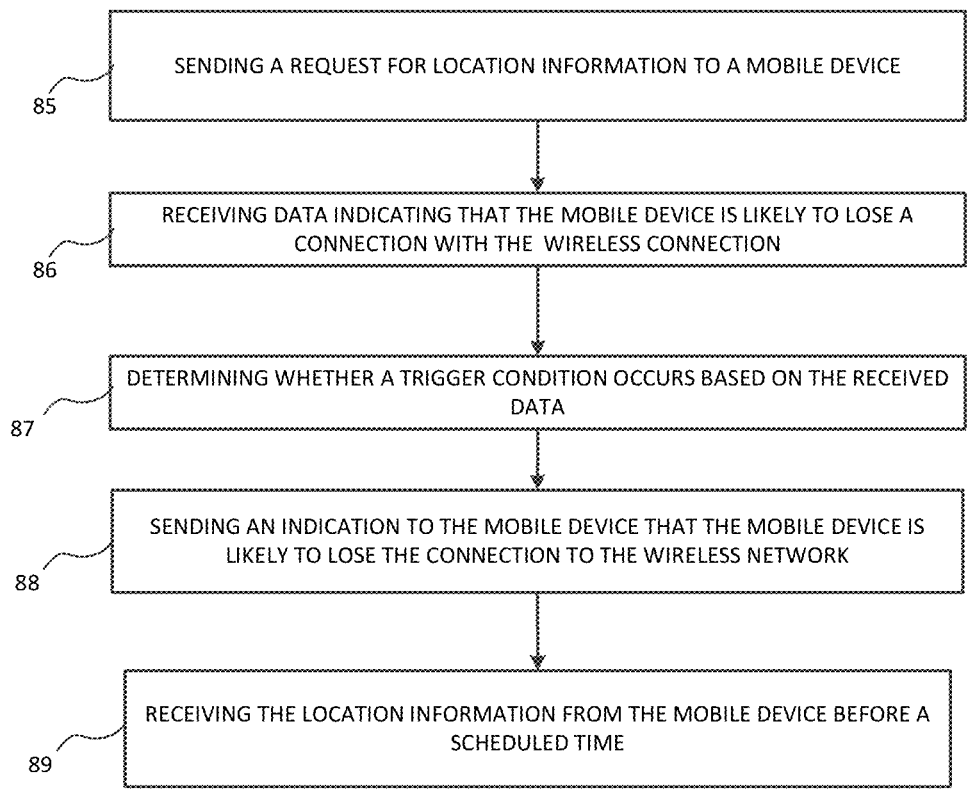
FIG. 7 is a flow diagram of a method of operating the server of FIG. 4.

Referring to FIG. 7, with further reference to FIGS. 1-6, a method 7 of operating a location server 20 includes the stages shown. The method 7 is, however, an example only and not limiting. The method 7 can be altered, e.g., by having stages added, removed, rearranged, combined, performed concurrently, and/or having single stages split into multiple stages.

At stage 85, the method 7 includes sending a request for location information to a mobile device 10. The request may be sent, via the network interface 62, in a message that is part of the LPP protocol and may include a scheduled time at which the mobile device 10 should send the location information to the location server 20.

At stage 86, the method 7 includes receiving data indicating that the mobile device is likely to lose a connection with the wireless connection. As described above, this data may be received from the mobile device 10 or from base station 22 and stored in memory 61. For example, the mobile device may send RSRP and/or RSRQ values to the server 20 and the base station 22 may send an indication that a handover to from an LTE network to a non-LTE network is about to occur.

At stage 87, the method 7 includes determining whether a trigger condition occurs based on the received data. The processor 60 of the server 20 may determine whether a trigger condition occurs as described above in connection with FIG. 5.

At stage 88, the method 7 includes sending an indication to the mobile device 10 that the mobile device 10 is likely to lose the connection to the wireless network 21. The indication may be in the form of a message that requests the location information at a time before the scheduled time.

At stage 89, the method 7 includes receiving the location information from the mobile device before a scheduled time.

OTHER CONSIDERATIONS

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

A wireless network is a communication system in which communications are conveyed wirelessly, i.e., by electromagnetic and/or acoustic waves propagating through atmospheric space rather than through a wire or other physical connection. A wireless network may not have all communications transmitted wirelessly, but is configured to have at least some communications transmitted wirelessly.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions.

The processes, systems, and devices discussed above are examples. Various configurations may omit, substitute, or add various procedures or components as appropriate. For instance, in alternative configurations, the processes may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method of sending information from a mobile device to a server, the method comprising:
    obtaining, by a processor of the mobile device, a scheduled time to send the information to the server;
    determining, by the processor, that a trigger condition is met before the scheduled time by determining that the mobile device is likely to lose a connection to a first wireless packet-switched communications network before the scheduled time by determining that a transceiver of the mobile device will stop communicating with the first wireless packet-switched communications network to begin communicating with a second wireless packet-switched communications network;
    sending, via a transceiver of the mobile device and via the first wireless packet-switched communications network, a wireless signal comprising at least a first portion of the information to the server, wherein the wireless signal is sent before the scheduled time and in response to determining that the trigger condition is met before the scheduled time; and sending at least a second portion of the information to the second wireless packet-switched communications network after sending the first portion of the information.

2. The method of claim 1, wherein determining that the mobile device is likely to lose the connection to the first wireless packet-switched communications network comprises determining that a signal strength indicator is below a signal strength threshold and/or a signal quality indicator is below a signal quality threshold.

3. The method of claim 1, wherein the first portion of the information is supported by the first wireless packet-switched communications network and not supported by the second wireless packet-switched communications network, and the second portion of the information is supported by the first wireless packet-switched communications network and the second wireless packet-switched communications network.

4. The method of claim 3, wherein the first portion of the information comprises Wi-Fi-based positioning measurements, observed-time-difference-of-arrival-based positioning measurements, or a combination thereof, and the second portion of the information comprises GNSS-based positioning measurements.

5. The method of claim 3, wherein:
the first wireless packet-switched communications network is a long term evolution (LTE) network and the second wireless packet-switched communications network is a non-LTE network.

6. The method of claim 1, wherein the information comprises location information regarding the location of the mobile device.

7. The method of claim 6, wherein the location information comprises reference signal time difference (RSTD) measurement data.

8. The method of claim 7, wherein the scheduled time is an early time or a final time associated with a long term evolution (LTE) positioning protocol (LPP).

9. The method of claim 1, further comprising periodically sending measurement reports to the server prior to determining that the trigger condition is met.

10. A mobile device for sending information to a server, the mobile device comprising:
a transceiver for wirelessly transmitting messages to and wirelessly receiving messages from the server via a first wireless packet-switched communications network or a second wireless packet-switched communications network, or a combination thereof;
a processor, communicatively coupled to the transceiver, configured to:
obtain a scheduled time to send the information to the server;
determine that a trigger condition is met before the scheduled time by determining that the mobile device is likely to lose a connection to the first wireless packet-switched communications network before the scheduled time by determining that the transceiver will stop communicating with the first wireless packet-switched communications network to begin communicating with a second wireless packet-switched communications network;
send, via the transceiver and via the first wireless packet-switched communications network, a wireless message comprising at least a first portion of the information to the server, wherein the wireless signal is sent before the scheduled time and in response to determining that the trigger condition is met before the scheduled time; and send at least a second portion of the information to the second wireless packet-switched communications network after sending the first portion of the information.

11. The mobile device of claim 10, wherein the processor is configured to determine that the mobile device is likely to lose a connection to the first wireless packet-switched communications network by determining that a signal strength indicator is below a signal strength threshold and/or a signal quality indicator is below a signal quality threshold.

12. The mobile device of claim 10, wherein the first portion of the information is supported by the first wireless packet-switched communications network and not supported by the second wireless packet-switched communications network, and the second portion of the information is supported by the first wireless packet-switched communications network and the second wireless packet-switched communications network.

13. The mobile device of claim 12, wherein the first portion of the information comprises Wi-Fi-based positioning measurements, observed-time-difference-of-arrival-based positioning measurements, or a combination thereof, and the second portion of the information comprises GNSS-based positioning measurements.

14. The mobile device of claim 12, wherein:
the first wireless packet-switched communications network is a long term evolution (LTE) network and the second wireless packet-switched communications network is a non-LTE network.

15. The mobile device of claim 10, wherein the information comprises location information regarding the location of the mobile device.

16. The mobile device of claim 15, wherein the location information comprises reference signal time difference (RSTD) measurement data.

17. The mobile device of claim 16, wherein the scheduled time is an early time or a final time associated with a long term evolution (LTE) positioning protocol (LPP).

18. The mobile device of claim 10, wherein the processor is further configured to periodically send, to the server via the transceiver, measurement reports prior to determining that the trigger condition is met.

19. A non-transitory, processor-readable storage medium comprising processor-readable instructions configured to cause a processor of a mobile device to:
obtain a scheduled time to send information to a server;
determine that a trigger condition is met before the scheduled time by determining that the mobile device is likely to lose a connection to a first wireless packet-switched communications network before the scheduled time by determining that a transceiver of the mobile device will stop communicating with the first wireless packet-switched communications network to begin communicating with a second wireless packet-switched communications network;
send, via the transceiver of the mobile device and via the first wireless packet-switched communications network, a wireless signal comprising at least a first portion of the information to the server, wherein the instructions configured to cause the processor to send the wireless signal are configured to send the wireless signal in response to determining that the trigger condition is met before the scheduled time; and
send at least a second portion of the information to the second wireless packet-switched communications network after sending the first portion of the information.

20. The non-transitory, processor-readable storage medium of claim 19, wherein the information comprises location information regarding the location of the mobile device.

21. The non-transitory, processor-readable storage medium of claim 20, wherein the location information comprises reference signal time difference (RSTD) measurement data.

22. The non-transitory, processor-readable storage medium of claim 21, wherein the scheduled time is an early time or a final time associated with a long term evolution (LTE) positioning protocol (LPP).

23. A mobile device for sending information to a server, the mobile device comprising:
   means for obtaining a scheduled time to send the information to the server;
   means for determining that a trigger condition is met before the scheduled time by determining that the mobile device is likely to lose a connection to a first wireless packet-switched communications network before the scheduled time by determining that a transceiver of the mobile device will stop communicating with the first wireless packet-switched communications network to begin communicating with a second wireless packet-switched communications network;
   means for sending, via the first wireless packet-switched communications network, a wireless signal comprising at least a first portion of the information to the server, wherein the means for sending sends the wireless signal before the scheduled time and in response to the trigger condition before the scheduled time; and
   means for sending at least a second portion of the information to the second wireless packet-switched communications network after sending the first portion of the information.

24. The mobile device of claim 23, wherein the information comprises location information regarding the location of the mobile device.

25. The mobile device of claim 24, wherein the location information comprises reference signal time difference measurement (RSTD) data.

26. The mobile device of claim 24, wherein the scheduled time is an early time or a final time associated with a long term evolution (LTE) positioning protocol (LPP).

* * * * *